(12) United States Patent
Ikemoto

(10) Patent No.: US 8,399,256 B2
(45) Date of Patent: Mar. 19, 2013

(54) METHOD FOR INTRODUCING GENE INTO CELL, AND COMPOSITION FOR USE IN THE METHOD

(75) Inventor: Kazuto Ikemoto, Niigata (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 0 days.

(21) Appl. No.: 13/124,434

(22) PCT Filed: Oct. 13, 2009

(86) PCT No.: PCT/JP2009/067731
§ 371 (c)(1),
(2), (4) Date: Apr. 15, 2011

(87) PCT Pub. No.: WO2010/044395
PCT Pub. Date: Apr. 22, 2010

(65) Prior Publication Data
US 2011/0201120 A1    Aug. 18, 2011

(30) Foreign Application Priority Data
Oct. 15, 2008 (JP) .................. 2008-266610

(51) Int. Cl.
*C12N 15/00* (2006.01)
*C12N 5/00* (2006.01)
*C07D 295/00* (2006.01)

(52) U.S. Cl. ............. 435/455; 435/375; 548/518

(58) Field of Classification Search ............. None
See application file for complete search history.

(56) References Cited

U.S. PATENT DOCUMENTS

| 4,945,050 A | 7/1990 | Sanford et al. |
| 7,927,874 B2 * | 4/2011 | Ikemoto et al. ............ 435/459 |

FOREIGN PATENT DOCUMENTS

| JP | 2002-171969 A | 6/2002 |
| JP | 2005-060491 A | 3/2005 |
| JP | 2006-174720 A | 7/2006 |
| JP | 2008-190091 A | 8/2008 |
| JP | 2008-220298 A | 9/2008 |
| WO | WO 2007/132891 A1 | 11/2007 |

OTHER PUBLICATIONS

International Search Report, corresponding with International Application No. PCT/JP2009/067731 dated Nov. 10, 2009, 4 pages (in English/Japanese).

Yu, D. et al., "Sendai virus-based expression of HIV-1 gp 120: reinforcement by the V(−) version", Genes Cells, Jul. 1997, vol. 2(7), pp. 457-466.

Felgner, P.L. et al., "Lipofection: a highly efficient, lipid-mediated DNA-transfection procedure", Proc. National Academy of Science USA, Nov. 1987, vol. 84(21), pp. 7413-7417.

Goula, D., et al., "Size, diffusibility and transfection performance of linear PEI/DNA complexes in the mouse central nervous system", Gene Therapy, May 1998, vol. 5(5), pp. 712-717.

* cited by examiner

*Primary Examiner* — Janet Epps-Smith
(74) *Attorney, Agent, or Firm* — Fitch, Even, Tabin & Flannery, LLP

(57) ABSTRACT

The present invention provides a method for transferring a gene into cells, which is practically useful and can achieve high transfer efficiency, and also a composition for use in the method. By bringing a mixture of a composition comprising a diallylamine sulfur dioxide copolymer having a repeating unit represented by the formula (1) or a salt thereof and a gene into contact with a cell, a gene such as DNA and RNA can be transferred into a target cell safely and conveniently, and into a cell at a specific site with high gene transfer efficiency.

12 Claims, 4 Drawing Sheets

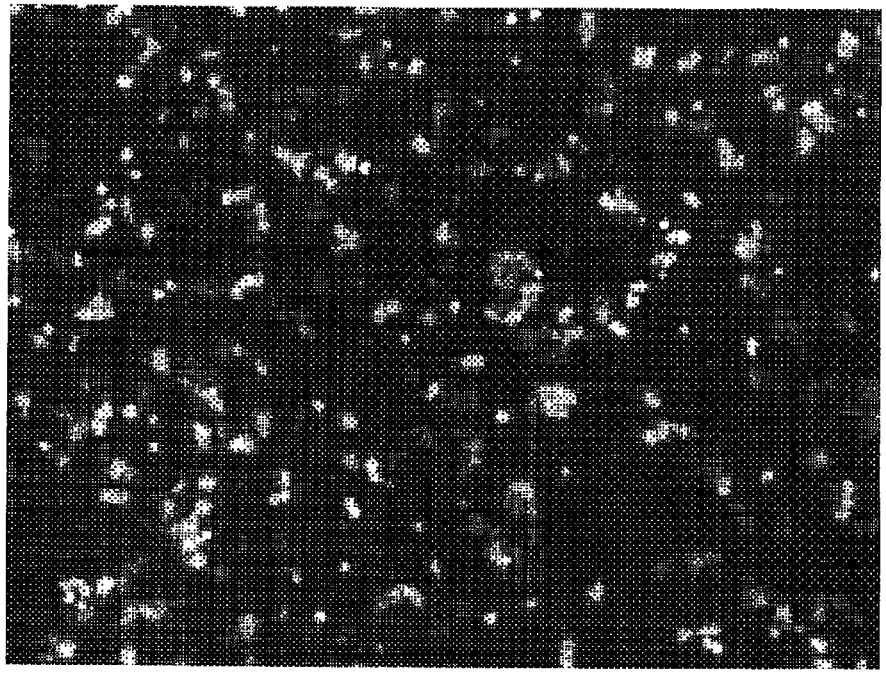
Fig. 1: A fluorescence microscopic photograph of CHO cells into which GFP gene is transferred.
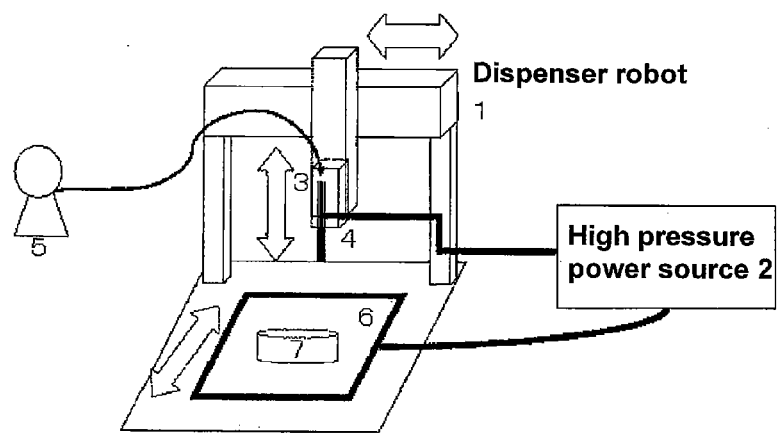
Fig. 2

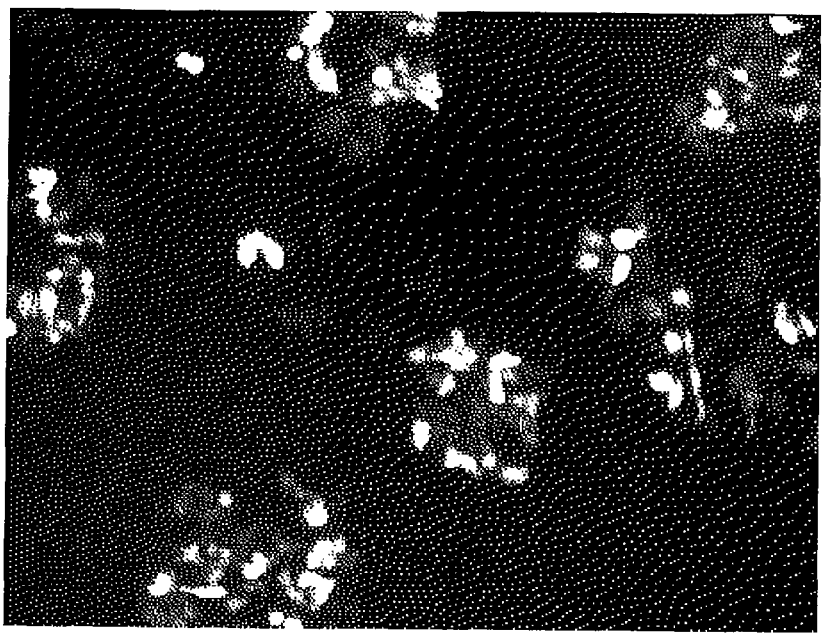
Fig. 3: A fluorescence microscopic photograph of CHO cells which are entirely and uniformly sprayed by an electrospraying apparatus.
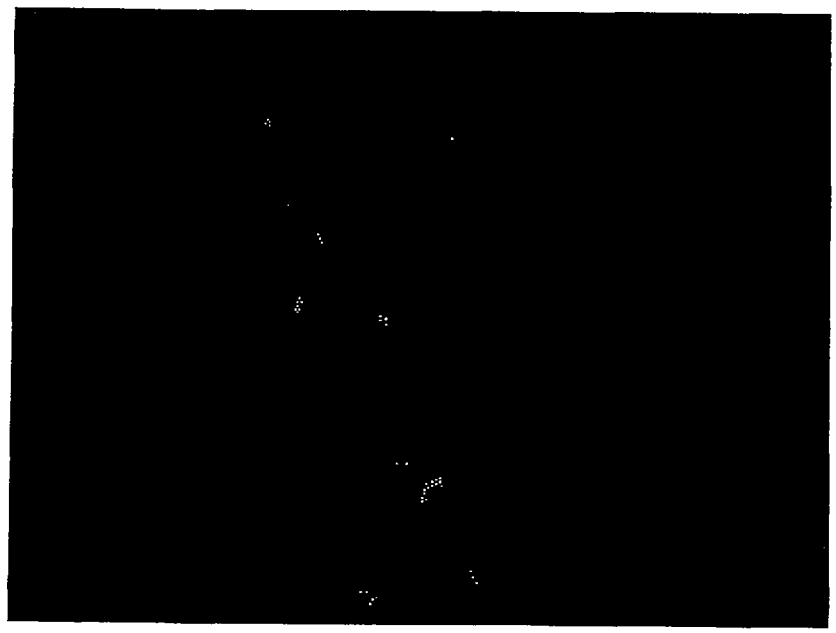
Fig. 4: A fluorescence microscopic photograph of CHO cells into which a gene is transferred in a straight line form by an electrospraying apparatus.

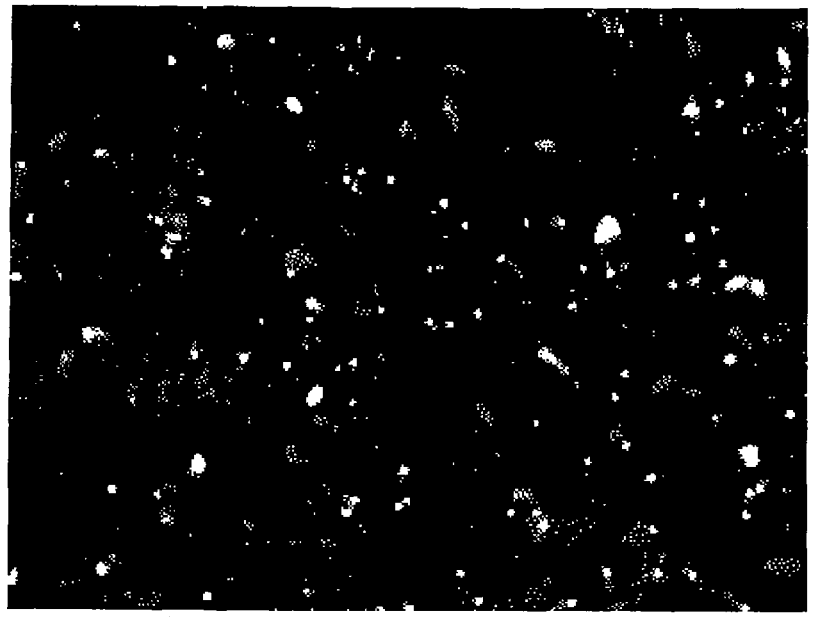
Fig. 5: A fluorescence microscopic photograph of CHO cells into which GFP gene is transferred by use of fluorescein-4-isothiocyanated diallylamine sulfur dioxide copolymer.
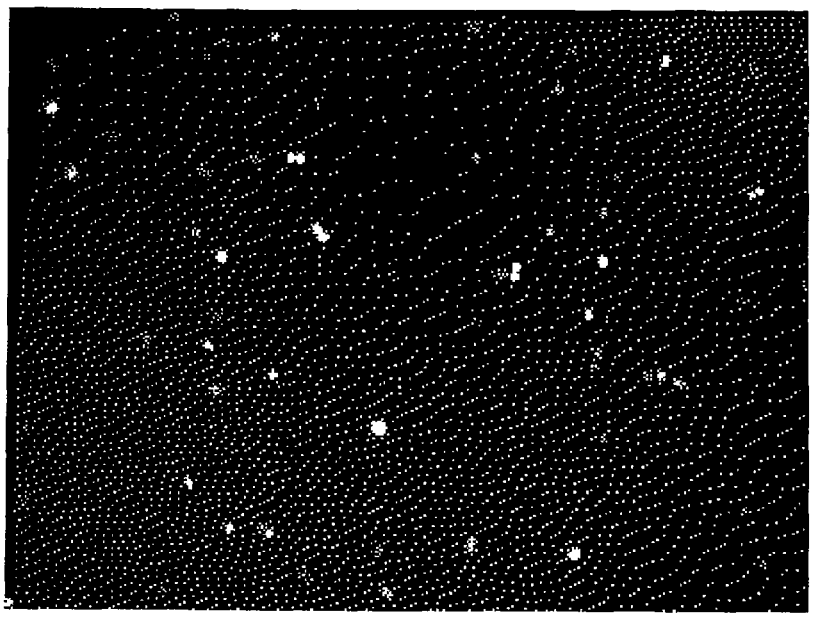
Fig. 6: A fluorescence microscopic photograph of nonadherent Jurkat cells into which GFP gene is transferred.

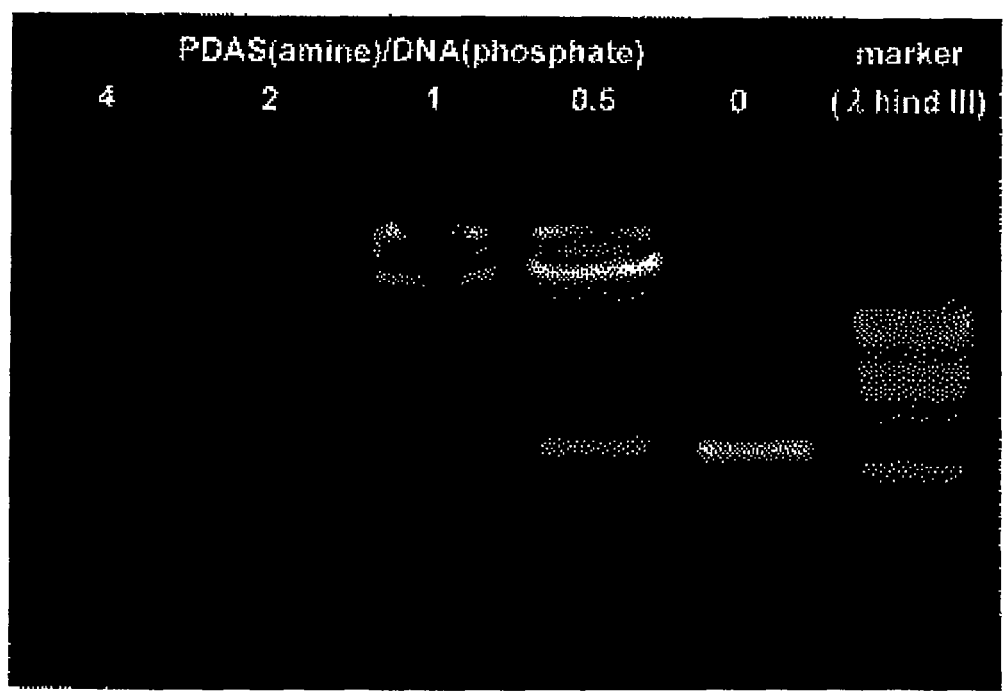
Fig. 7: An electrophoresis photograph of a mixture of diallyamine sulfur dioxide copolymer and plasmid DNA.

METHOD FOR INTRODUCING GENE INTO CELL, AND COMPOSITION FOR USE IN THE METHOD

CROSS-REFERENCE TO RELATED APPLICATIONS

This is the U.S. National Phase application of International Application PCT/JP2009/067731, filed Oct. 13, 2009, and claims priority benefit under 35 U.S.C. §119 based on Japanese Application No. 2008266610, filed Oct. 15, 2008, the entire disclosures of which applications are hereby incorporated herein by reference.

TECHNICAL FIELD

The present invention relates to a method for transferring a gene into cells, characterized by use of a diallylamine sulfur dioxide copolymer represented by the formula (1) or a salt thereof, and a composition for use in the method. By use of the method for transferring a gene into cells according to the present invention, a gene can easily and economically be transferred into cells. The method which can efficiently transfer a gene such as DNA and RNA into cells can be research means in medical, pharmaceutical, agricultural and other biotech-related fields or useful technical means in clinical scene such as gene therapy and targeting therapy against cancer cells.

BACKGROUND ART

Many proposals have been made for methods of transferring a gene such as DNA and RNA into cells, but still cannot be said to be satisfactory, and are problematic in that the transfer techniques per se are complex and also low in transfer efficiency. For example, there has been proposed a method for transferring a gene into cells utilizing a virus (e.g., refer to Non-Patent Document 1). However, when a virus is used, a gene to be transferred must be purified with a complicated method, and there may be a risk that the virus may transfer a gene into cells or tissues that are not intended. Also, it is required to consider a risk of biohazard due to the virus.

In addition, there has been proposed a calcium phosphate method (e.g., refer to Non-Patent Document 2). This is a method in which calcium phosphate particles containing DNA are produced and taken up into cells due to endocytosis. However, this method is problematic in that the procedures are complicated and low in transfer efficiency. As an improved method thereof, there has been proposed a method in which a substance is taken up into cells utilizing a reagent such as a cationic liposome and a cationic polymer (e.g., refer to Non-Patent Documents 3 and 4). The cationic liposome is problematic in that it is low in gene transfer efficiency because it is easily decomposed by a lysosome and the like in a cell after being taken up into the cell through the endocytosis process. Further, synthesis of molecule species used in the liposome is complicated, and complicated production methods are required including ultrasonic treatment used for liposome formation. As a cationic polymer for transferring a gene, one having a straight chain structure of polyethyleneimine is said to be efficient. However, when polyethyleneimine is synthesized from commercially available raw materials, it is very difficult to obtain the straight chain molecule since ring-opening polymerization of ethyleneimine is required which yields a branched structure with primary, secondary and tertiary amines.

Besides, a method called as electroporation is frequently used (for example, refer to Patent Document 1). This is a method in which a high voltage in pulse form is applied to a suspension of a gene together with cells so that the gene contained in the suspension is allowed to be taken up into cells. This method has a wide range of application and is high in gene transfer efficiency, but cannot transfer the gene without cell death since the gene transfer efficiency has a proportional relation with cell lethality. That is, it is problematic in that when a pulse condition is improper, not only the target substance cannot be transferred into the cell, but also the cell may die. Also, electric conductivity of the cell suspension must be lowered in order to prevent so-called towing which is electric discharge into a solution.

In addition, when a gene is transferred into cells using a reagent or virus, it is difficult to transfer it into a specified site, and particularly it is very difficult to transfer it into just a targeted site of the cells that are attached to a petri dish on which the substance to be transferred easily diffuses due to the medium contained therein. Similarly, even with electroporation, it is difficult to transfer the gene into the attached cells without peeling of cells or cell fusion.

Therefore, the methods in which genes are transferred into cells using a conventional virus or reagent have technical problems such that the procedure itself is very complicated and difficult to practice. Also, particularly when a medium is present, there has been a problem such that a solution of a gene to be transferred is diffused but cannot be focused on a site where target cells are present, while peeling of cells or cell fusion easily occur.

[Conventional Technical Documents]
[Patent Documents]
Patent Document 1: U.S. Pat. No. 4,945,050
[Non-Patent Documents]
Non-Patent Document 1: D. Yu, T. Shioda, A. Kato, M. K. Hasan, Y. Sakai, Y. Nagai, Genes Cells, 1997 vol. 2(7), p. 457-66
Non-Patent Document 2: F. L. Graham, A. J. Van Der Eb, Virology, 1973, vol. 52, p 446-467.
Non-Patent Document 3: P. L. Felgner, T. R. Gadek, M. Holm, R. Roman, H. W. Chan, M. Wenz, J. P. Northrop, G. M. Ringold, M. Danielsen, Proc. Natl. Acad. USA, Vol. 84, p 7413-7417.
Non-Patent Document 4: D. Goula, J. Remy, P. Erbacher, M. Wasowicz, G. Levi, B. Abdallah, B. Demeneix, Gene. Therapy, 1998, vol. 5, p 712-717.

DISCLOSURE OF THE INVENTION

Problems to be Solved by the Invention

The present invention aims at establishing and providing a method for transferring a gene into cells using a composition containing a substance which promotes gene transfer into cells.

Means for Solving Out the Problems

The present inventor has intensively studied substances that promote the uptake of genes into cells, and has found that genes can be transferred into cells with high transfer efficiency and little toxicity by using straight-chain polyamine analogues, particularly diallylamine sulfur dioxide copolymers or salts thereof. Thus, the present invention has been completed. Also, he has found that a gene can be transferred into cells present at a targeted site by allowing a sugar or polyethylene glycol to coexist or using a spraying means such as a jet printer. Thus, the present invention has been completed.

That is, the present invention relates to a method for transferring a gene into cells, characterized by use of a diallylamine sulfur dioxide copolymer represented by the formula (1) or a salt thereof, and a composition for use in the method, as defined in the following items (1) to (11)

(1) A method for transferring a gene into cells, which comprises bringing a mixture of a gene and a composition comprising a diallylamine sulfur dioxide copolymer or a salt thereof into contact with a cell, said diallylamine sulfur dioxide copolymer comprising a repeating unit represented by the formula (1):

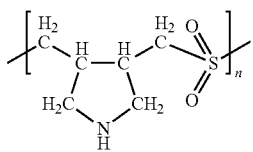

(1)

wherein n indicates an integer of 1 or more.

(2) The method for transferring a gene into cells according to item (1), wherein said diallylamine sulfur dioxide copolymer or a salt thereof is a salt of the diallylamine sulfur dioxide copolymer.

(3) The method for transferring a gene into cells according to item (2), wherein the salt is a salt with at least one acid selected from acetic acid, phosphoric acid and hydrochloric acid.

(4) The method for transferring a gene into cells according to item (3), wherein the acid is hydrochloric acid.

(5) The method for transferring a gene into cells according to any one of items (1) to (4), wherein said composition comprises a diallylamine sulfur dioxide copolymer or a salt thereof in a concentration of 1 ng/mL to 200 mg/mL.

(6) The method for transferring a gene into cells according to item (1), wherein said mixture further comprises a polyethylene glycol.

(7) The method for transferring a gene into cells according to item (1), wherein said gene is a single or double stranded DNA or a single or double stranded RNA.

(8) The method for transferring a gene into cells according to any one of items (1) to (7), wherein the mixture is sprayed onto a cell in order to bring the mixture into contact with a cell.

(9) A composition for transferring a gene into cells, which comprises a diallylamine sulfur dioxide copolymer or a salt thereof, said diallylamine sulfur dioxide copolymer comprising a repeating unit represented by the formula (1):

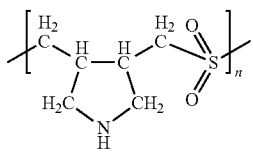

(1)

wherein n indicates an integer of 1 or more.

(10) The composition according to item (9), which comprises a diallylamine sulfur dioxide copolymer or a salt thereof in a concentration of 1 ng/mL to 200 mg/mL.

(11) The composition according to item (9), which further comprises a polyethylene glycol.

EFFECTS OF THE INVENTION

By using a diallylamine sulfur dioxide copolymer as a cationic polymer having a gene transferability according to the present invention, a conjugate with DNA or RNA having a negative electric charge is formed, and thereby makes it possible to transfer a gene with a high transfer efficiency into cells present even at a specified site.

BRIEF DESCRIPTION FOR DRAWINGS

FIG. 1 is a fluorescence microscopic photograph showing CHO cells into which GFP gene is transferred;

FIG. 2 shows an experimental apparatus for electrospraying;

FIG. 3 is a fluorescence microscopic photograph of CHO cells which are entirely and uniformly sprayed by the electrospraying apparatus;

FIG. 4 is a fluorescence microscopic photograph of CHO cells into which a gene is transferred in a form of a straight line by the electrospraying apparatus FIG. 5 is a fluorescence microscopic photograph of CHO cells into which GFP gene is transferred by use of fluorescein-4-isothiocyanated diallylamine sulfur dioxide copolymer;

FIG. 6 is a fluorescence microscopic photograph of suspended Jurkat cells into which GFP gene is transferred; and FIG. 7 is a photograph of electrophoresis of a mixture of a diallyamine sulfur dioxide copolymer and a plasmid DNA.

BEST MODE FOR CARRYING OUT THE INVENTION

The present invention is used for transferring a negatively-charged substance into a cell, particularly an animal cell, and relates to a method in which a composition comprising a diallyamine sulfur dioxide copolymer represented by the formula (I) or a salt thereof is used.

The method of the present invention is a method for transferring a gene such as DNA and RNA into targeted cells, and is a method for transferring a gene by bringing a mixture of a substance of the formula (I) and a gene into contact with a cell. Besides the gene, those with a negative charge can be used in the method of the present invention effectively. In the present invention, DNA or RNA can be used in single- or double-stranded form. These DNA and RNA may be of cyclic or straight chain, and derived synthetically or biologically. Concrete examples thereof include plasmids, PCR products, DNA or RNA derived from a virus, DNA or RNA derived from a nucleic acid synthesizer and genome degradation products. These may cause an action or function such as protein expression and RNA interference. Molecular weight of DNA and RNA is not particularly limited, and it is readily expected that a smaller one is easier to be transferred into the cell generally.

The molecular weight of a diallylamine sulfur dioxide copolymer represented by the formula (I), which is to be used in the present invention, is not particularly limited, and from the viewpoint of easiness of availability, it is preferably 300-200,000 and more preferably 1,000-10,000.

The substance shown in the formula (I) is often provided as a salt. A salt to be used may be selected considering solubility, transferability and toxicity to the cell. A diallyamine sulfur dioxide copolymer with no acid radical is low in solubility on alkaline condition, and thus the salt is preferably used for pH adjustment and improvement of solubility. The acid radical used in the present invention may be of a mineral or organic acid, and examples thereof include hydrochloric acid, sulfuric acid, nitric acid, hydrobromic acid, fluoric acid, hydroiodic acid, phosphoric acid, diphosphoric acid, triphosphoric acid, polyphosphoric acid, acetic acid, lactic acid, citric acid, carbonic acid, tartaric acid, oxalic acid and boric acid. Of these, hydrochloric acid, phosphoric acid and acetic acid are preferable as they are excellent in solubility and transferability, and hydrochloric acid which is a monovalent mineral acid is particularly preferable as it has good solubility and is excellent in handleability and transferability.

One with a structure shown in the formula (I) as a repeating unit is effective for the gene transfer, and may be modified, if required. An easy modification method is to introduce into an amino group, a substituent including, for example, a substituent such as a polyethylene glycol group which changes affinity with a membrane, a substituent having fluorescence or a substituent to which biotin is attached. Degree of introduction of the substituent is preferably from 0.1% to 30% or less and more preferably from 0.2% to 10% relative to the total amino groups. It is expected that when a substituent is added too much, transferability of the substance to the cell may be decreased, and thus a substituent should be added considering the ability thereof. As a substituent to be introduced, labeling reagents used for labeling an amino group of proteins and peptides can be used. Concrete examples thereof include 4-fluoro-7-nitrobenzofurazan, fluoresein-4-isothiocyanate, N-ethyl-N'-[5-(N''-succinimidyloxycarbonyl)pentyl]-3,3,3', 3'-tetramethyl-2,2'-indodicarbocyanine chloride, HiLyte Fluor 555 labeling kit (manufactured by DOJINDO LABORATORIES), HiLyte Fluor 647 labeling kit (manufactured by DOJINDO LABORATORIES), Biotin Labeling kit (manufactured by DOJINDO LABORATORIES) and polyethyleneglycol iodide.

A diallylamine sulfur dioxide copolymer is usually used in the form of a solution which is diluted to a proper concentration, and this solution corresponds to a composition for transferring a gene into cells according to the present invention. However, the composition for transferring a gene into cells according to the present invention may comprise other components such as sugar and polyethylene glycol in addition to a diallylamine sulfur dioxide copolymer, as described in the followings. Concentration of the diallylamine sulfur dioxide copolymer in the solution is preferably 1 ng/mL to 200 mg/mL and particularly preferably 10 ng/mL to 10 mg/mL. In the method of the present invention, DNA or RNA as a negatively-charged substance is first mixed with a substance shown in the formula (I) so that a conjugate of the two is formed. The conjugate is considered to be formed by confronting each one amino group of the compound of the present invention with each one base of DNA or RNA as a gene. Such a mixing ratio is considered idealistic, but can be changed depending upon types of media or conditions of cells. That is, it is used in a ratio of preferably 0.001-1,000 and more preferably 0.01-100 in terms of (bases of DNA or RNA to be used)/(amino groups of the substance of the formula (1)).

By bringing the thus-formed conjugate of the gene and the diallylamine sulfur dioxide copolymer into contact with the cell, the conjugate is allowed to be taken up into the cell. That is, based on the results of the working examples and others, the present inventor presumes a mechanism of transfer as follows. Each one phosphoric acid group of DNA or RNA forms a salt with one amino group of the diallylamine sulfur dioxide copolymer, and the whole electric charge changes from negative to positive. In this instance, even if a conformation like a double helix structure is formed, the change in electric charge occurs whilst the conformation is maintained. It is considered that the conjugate that has been changed in electric charge is easily attached to the cell and taken up therein due to endocytosis, and then the conjugate dissociates in the cell and becomes ready for transcription.

The addition to the cell is preferably performed in an environment that does not affect the cell so much, for example, in a serum-containing medium, serum-free medium, buffer, physiological saline solution or the like. More preferably, it may be performed in a serum-free environment. As a medium for culturing a cell, one with buffer capacity is usually used, and thus the pH value of the solution of the substance of the formula (I) to be used is not particularly limited, but more exactly, it is desirable to use those with preferably a pH of 2 to 11 and more preferably a pH of 5 to 9.

The cell which is subjected to the present invention may be an adherent or nonadherent cell and is not particularly limited; for example, a cell having a cell wall such as a plant cell may be treated with a cellulase or the like before brought into contact with the conjugate with a gene to be transferred, in order to improve efficiency of transfer into cells.

The conjugate of the substance of the formula (I) with DNA or RNA can be used in the coexistence of a sugar or polyethylene glycol for osmotic pressure and cell protection. Concrete examples of the sugar include sucrose, glycerin aldehyde, threose, arabinose, xylose, ribose, ribulose, xylulose, glucose, mannose, galactose, tagatose, allose, altose, gulose, idose, talose, sorbose, psicose, fructose, trehalose, threitol, erythritol, adonitol, arabitol, xylitol, talitol, sorbitol, mannitol, iditol, dulcitol, inositol, glucose syrup, hydrogenated glucose syrup, palatinit, agar, carboxymethylcellulose, carrageenan and hydrolyzed starch oligosaccharide. Particularly, polyethylene glycol can inhibit dispersing dilution of a liquid by increasing viscosity, and thus makes it possible to transfer a gene into cells at a specific site intensively. Polyethylene glycol is low in cell toxicity and thus can be used for such an application. These may be added in a concentration that provides proper osmotic pressure and viscosity. The additional components preferably constitute 0.01% to 99%, more preferably 1% to 90% whilst the rest is constituted by the substance of the formula (I), the substance to be transferred and water. An addition method is that DNA or RNA is mixed with the compound of the formula (I), and then a polyethylene glycol is mixed therewith, followed by addition of cells, or that a mixture of DNA or RNA with the compound of the formula (I) is added to a mixture of cells with a polyethylene glycol.

In addition, by spraying the above conjugate to cells by use of the composition of the present invention and a spraying mean such as a jet printer, it can be transferred into the cells at a targeted site. The jet printer is widely adopted as a means that can precisely spray at low cost. As a result of the use of this for transferring DNA or RNA into the cell, an important technical tool which can be used with inexpensive and simple operations is provided for use in research for elucidating a system for intercellular communication and use in analysis of cell development, differentiation and function. The spraying mechanism of ejecting a liquid from a jet printer is not particularly limited. Especially, a method using electrospraying is preferable because it can be carried out without heating. Also, the use of electrospraying enables uniform spraying and adhesion without need to decrease the scanning pitch of the jet printer.

EXAMPLE

Hereinafter, the present invention will be described concretely by way of Examples and Comparative Examples. However, the present invention is in no way restricted to these Examples.

Example 1

1. Preparation of a Solution of an Agent for Transferring into Cells

As a composition containing an agent shown in the formula (1) for transferring into cells, a 20 wt % aqueous solution (PAS-92, molecular weight: 5000, manufactured by NittoBoseki Co., Ltd.) of a diallylamine sulfur dioxide copolymer (hereinafter, referred to as PDAS) hydrochloride was used to prepare the solutions shown in the followings (a) to (e) for transferring into cells.

(a) Neutralized aqueous solution (concentration: 2 mg/mL, pH 6.5): The 20 wt % aqueous solution of PDAS hydrochloride was neutralized and diluted using a 10 wt % aqueous sodium hydroxide solution and water to prepare a 2 mg/mL PDAS neutralized aqueous solution (pH 6.5).

(b) Acidic aqueous hydrochloric acid solution (concentration: 2 mg/mL, pH 2): The 20 wt % aqueous solution of PDAS hydrochloride was diluted with water to prepare a 2 mg/mL PDAS acidic aqueous hydrochloric acid solution (pH 2).

(c) Alkali aqueous solution (concentration: 2 mg/mL, pH 12): To 50 μL of the 20 wt % aqueous solution of PDAS hydrochloride, 100 μL of a 10 wt % aqueous sodium hydroxide solution was added, and the resulting free white precipitates were collected by centrifugation, and then dissolved again with addition of water, to prepare a 2 mg/mL PDAS alkali aqueous solution (pH 12).

(d) Acidic aqueous phosphoric acid solution (concentration: 2 mg/mL, pH 5): To 50 μL of the 20 wt % aqueous solution of PDAS hydrochloride, 100 μL of a 10 wt % aqueous sodium hydroxide solution was added, and the resulting free white crystal was collected by centrifugation, and then dissolved again with addition of 10 μL of a 85 wt % aqueous phosphoric acid solution, to prepare a 2 mg/mL PDAS aqueous phosphate solution (pH 5).

(e) Acidic aqueous sulfate solution (concentration: 2 mg/mL, pH 1) and the same (concentration: 5 mg/mL, pH 1): To 50 μL of the 20 wt % aqueous solution of PDAS hydrochloride, 100 μL of a 10 wt % aqueous sodium hydroxide solution was added, and the resulting free white crystal was collected by centrifugation, and then dissolved again with addition of 10 μL of conc. sulfuric acid and water, to prepare a 2 mg/mL PDAS aqueous sulfate solution (pH 1). Also, an amount of water to be finally added was changed to prepare a 5 mg/mL PDAS aqueous sulfate solution (pH 1).

(f) Aqueous acetate solution (concentration: 2 mg/mL, pH 6): To 50 μL of the 20 wt % aqueous solution of PDAS hydrochloride, 100 μL of a 10 wt % aqueous sodium hydroxide solution was added, and the resulting free white crystal was collected by centrifugation, and then dissolved again with addition of 10 μL of acetic acid and water, to prepare a 2 mg/mL PDAS aqueous acetate solution (pH 6).

2. (a) Test of Gene Transfer into a Cell Using the Neutralized Aqueous Solution

An effect on efficiency of transfer of a gene into a cell was studied using a plasmid DNA (4.7 kpb) incorporated with a green fluorescence protein gene as a substance to be transferred into a cell, fibroblast (CHO cell) established from Chinese hamster ovary on biopsy as the cell, and the neutralized aqueous solution (a) as a solution of an agent for transferring into the cell.

CHO cells were seeded on a polystyrene petri dish with a diameter of 3.5 cm and cultured in an α-MEM medium+10% fetal bovine serum (FBS) medium in a $CO_2$ incubator at 37° C. 50 μL of a 100 μg/mL aqueous plasmid DNA solution (pH 7) was added to 10 μL of the neutralized aqueous solution (a) (2 mg/mL, pH 6.5) and mixed, and then, the mixture was incubated at room temperature for 10 minutes. This was added to the petri dish containing 2 mL of the above medium in a cell concentration of $150 \times 10^4$ cell/dish. After culturing overnight, degree of transfer of the plasmid DNA into the cell was observed using a microscope TE-2000S manufactured by NIKON with objective lens×10, a fluorescence filter GFP block manufactured by NIKON, and a high voltage mercury lamp as a light source. As a result, 27% of cells generated fluorescence, and thus transfer of the gene was confirmed. The fluorescence microscopic photograph is shown in FIG. 1.

Examples 2-7 and Comparative Examples 1 and 2

A test of transferring the plasmid DNA into the cell was performed in the same manner as in Example 1 using each of the solutions of the agents for transferring into cells prepared in Example 1. The result thereof is shown in Table 1. The reagents prepared in Example 1 had an effect of promoting the transfer of a gene into cells, and particularly when the pH value is close to neutral, a higher efficiency of gene transfer was observed. In contrast, little gene was transferred without use of the present agent for transferring into cells or with use of a commercially available polyethyleneimine.

TABLE 1

Gene transferability of diallylamine sulfur dioxide copolymer or its salt*

| Example | Solution of agent for transferring into cells | Concentration | Transferring efficiency |
|---|---|---|---|
| 2 | (b) Acidic aqueous hydrochloric acid solution (pH2) | 2 mg/mL | 19% |
| 3 | (c) Alkali aqueous solution (pH12) | 2 mg/mL | 8% |
| 4 | (d) Acidic aqueous phosphoric acid solution (pH5) | 2 mg/mL | 33% |
| 5 | (e) Aqueous sulfate solution (pH1) | 2 mg/mL | 0.2% |
| 6 | (e) Aqueous sulfate solution (pH1) | 5 mg/mL | 7% |
| 7 | (f) Aqueous acetate solution (pH6) | 2 mg/mL | 41% |

| Comparative Example | Transferring reagent | Concentration | Transferring efficiency |
|---|---|---|---|
| 1 | None | | 0% |
| 2 | Polyethyleneimine manufactured by MP Biochemical, with molecular weight of 50,000-100,000, phosphated (pH6.5) | 2 mg/mL | 0% |

*CHO cell was used in $150 \times 10^4$ cell/dish

Examples 8-13

50 μL of the plasmid DNA (concentration: 100 μg/mL) and 10 μL of diallylamine sulfur dioxide copolymer hydrochloride (2 mg/mL, pH 6.5) prepared in Example 1 were mixed and left at room temperature for not less than 30 minutes. An additive was added thereto and mixed. The medium was removed from a petri dish which was then washed with a phosphoric acid buffer (the present phosphoric acid buffer (PBS) was an aqueous mixed solution (pH 7.2) of 0.21 g/L of $KH_2PO_4$, 9.0 g/L of NaCl and 0.726 g/L of $Na_2HPO_4.7H_2O$ and used for all Examples.) twice, and further 100 μL of PBS was added thereto, and then the above mixture was added. Two minutes later, the medium was added thereto. It was evaluated in the same manner as in Example 2. The result is shown in Table 2.

TABLE 2

Effect of addition of additives

| Example | Additives | | Transferring efficiency |
|---|---|---|---|
| 8 | Phosphoric acid buffer | 40 μL | 21% |
| 9 | Water | 40 μL | 56% |
| 10 | High Maltotetraose Syrup (TETRUP manufactured by Hayashibara Co., Ltd.) solid matter 72% | 40 μL | 51% |
| 11 | Hydrogenated Glucose Syrup (HS-60 manufactured by Hayashibara Co., Ltd.) solid matter 69% or larger | 40 μL | 7% |
| 12 | Maltosyltrehalose Syrup (HALLODEX manufactured by Hayashibara Co., Ltd.) solid matter 72% or larger | 40 μL | 22% |
| 13 | Sucrose | 0.1 g | 20% |

Example 14

50 μL of the plasmid DNA (concentration: 100 μg/mL) and 10 μL of diallylamine sulfur dioxide copolymer hydrochloride (2 mg/mL, pH 6.5) prepared in Example 1 were mixed and left at room temperature for not less than 30 minutes in the same manner as in the above Example 8. 0.07 g of a polyethylene glycol with molecular weight of 5000 was added thereto and mixed. The medium was removed from a petri dish which was then washed with a phosphoric acid buffer, and 100 μL of the phosphoric acid buffer was added thereto. The above mixture was added to a right half of the petri dish, and left for 2 minutes, and supplemented with the medium and cultured overnight.

As a result, gene transfer efficiency on the right half was 6% whilst gene transfer efficiency on the left half was not more than 0.5%. In this way, the gene transfer occurred just at the site to which the mixture was added, but was extremely suppressed at the other site.

Example 15

An electrostatic spray-type printer with a structure shown in FIG. 2 was used. The electrostatic spray-type printer was prepared by connecting a high voltage power source 2 to a 3-axis dispenser robot (SHOT mini SL) 1 manufactured by Musashi Engineering, Inc. A metal tube 3 was connected to a PEEK tube 4 (inside diameter: 0.25 mm, outside diameter: 1/16 inch, length: 3 cm). This portion can be moved by the disperser robot. The metal tube 3 was connected to a syringe pump 5 via a Teflon (registered trademark) tube. A high voltage is transmitted from the high voltage power source 2 via a high voltage cable to the metal tube 3, and electrostatic spray was performed from the tip of the PEEK tube 4. The stainless-steel countertop 6 of the dispenser robot was connected to an earth line of the high voltage power source 1. Above this, a polystyrene petri dish 7 containing cells was placed, and the countertop and the inside of the petri dish were electrically connected together via a stainless ribbon to have the same electrical potential. This apparatus was used to perform experiments of gene transfer.

2 mL of the plasmid DNA (100 μg/mL) and 400 μL of diallylamine sulfur dioxide copolymer hydrochloride (2 mg/mL, pH 6.5) were mixed together, and 1600 μL of water was added thereto. This was used as a solution fed by the pump. CHO cells were cultured for 3 days until a cell concentration of $20 \times 10^4$ cell/dish was reached. The medium was removed from a petri dish which was then washed with a phosphoric acid buffer twice, and 100 μL of the phosphoric acid buffer was added thereto. The medium was added thereto 3 minutes after the initiation of spraying.

A voltage of +10 kV was applied from the height of 2 cm. The nozzle was moved so as to draw lines spaced at 6 mm interval whilst spraying was performed therefrom at a liquid-supplying rate of 3 mL/hr for about 1 minute. A fluorescence microscopic photograph is shown in FIG. 3. The gene was transferred uniformly on the whole petri dish, and transfer efficiency was 66%.

Example 16

An experiment was performed in the same manner as in Example 15, except that the voltage was changed to −10 kV and the liquid-supplying rate was 6 mL/hr. As a result, the efficiency was 71%.

Example 17

An experiment was performed in the same manner as in Example 15, except that the voltage was changed to +10 kV and the liquid-supplying rate was 0.3 mL/hr. The result is shown in FIG. 4. Transfer was confirmed at the sprayed site, and thus was found to be site-specific.

Example 18

Fluorescence Labeling

The 20% diallylamine sulfur dioxide copolymer hydrochloride (molecular weight: 5000) was diluted with water to a concentration of 20 mg/mL (PAS-92 20 mg/mL) while the pH value was adjusted to 7 with NaOH. Also, fluorescein-4-isothiocyanate (FITC) manufactured by DOJINDO LABORATORIES was dissolved in dimethylsulfoxide at a concentration of 10 mg/mL. To 1 mL of the above PAS-92 (20 mg/mL), 160 μL of FITC (10 mg/mL) (which corresponds to an amount that provides one fluorescence group per one molecule of the diallyamine sulfur dioxide copolymer hydrochloride (molecular weight: 5000)) was added, and mixed. The mixture was treated at 37° C. for 1.5 hours. Water was added to dilute it to 2 mg/mL of PAS-92 (FITC-PAS). After the medium was removed, CHO cells were washed with a phosphoric acid buffer, and 100 μL of a phosphoric acid buffer was added thereto. Then, a mixture of 10 μL of FITC-PAS and 100 μL of the plasmid DNA was added thereto. After culturing overnight, the medium was changed, followed by observation with a fluorescence microscope. As a result, fluorescent cells as shown in FIG. 5 were obtained.

Example 19

Example with Nonadherent Cells

An experiment was performed using human lymphocyte culture Jurkat. RPMI1640 (manufactured by GIBCO) with 10% FBS was used as a medium. 100 μL of cells (360×10⁴ cell/mL), which was obtained by culturing in a $CO_2$ incubator, removing the medium by centrifugation, and suspending in a phosphoric acid buffer, was added to a 3.5 cm petri dish. A mixture, which was obtained by mixing 50 μL of the plasmid DNA (100 μg/mL) with 10 μL of diallylamine sulfur dioxide copolymer hydrochloride (2 mg/mL, pH 6.5) and left for not less than 10 minutes, was mixed with the cells. After left at room temperature for 15 minutes, it was supplemented with the medium, and on the next day, the resultant was observed with a fluorescent microscope. A fluorescence microscopic photograph is shown in FIG. 6.

The present invention was found to be effective for nonadherent cells, too.

Comparative Example 3

Jurkat was used in the same manner as in Example 19, except that PDAS was not used, and only the plasmid DNA was added to cells and left at room temperature for 15 minutes. Evaluation was performed in the same manner as above, but no fluorescent cell was observed, and no gene transfer was confirmed.

Example 20

Electrophoresis and UV Spectrum

100 μL of the plasmid (100 μg/mL) was mixed with a 1/10 diluted solution of diallylamine sulfur dioxide copolymer hydrochloride (2 mg/mL, pH 6.5) so that the mixing ratio of the amino groups of PDAS/the phosphoric acid groups of DNA was 0, 0.5, 1, 2 or 4. 10 μL of the resulting mixture was mixed with 1 μL of a loading buffer manufactured by Invitrogen, and then loaded on 1% agarose gel.

The agarose gel was subjected to electrophosis, and dyed with ethidium bromide. This is shown in FIG. 7. It is considered that there is one to one correspondence between an amino group of diallylamine sulfur dioxide copolymer hydrochloride and a base of DNA, and a phosphoric acid group of DNA and an amino group of PDAS form a salt. Further, diallylamine sulfur dioxide copolymer hydrochloride was excessively mixed with a DNA derived from salmon sperm, and UV-Vis spectrum was measured, but no change was observed in the absorbance and the maximum absorption wavelength. Thus, diallylamine sulfur dioxide copolymer changed the electric charge of the gene whilst the double helix structure was maintained.

Industrial Applicability

The method for transferring a gene into cells according to the present invention enables the gene to be transferred into cells easily and economically, and can efficiently transfer the gene such as DNA and RNA into cells, and thus can be utilized as research means in medical pharmaceutical, agricultural, and other biotech-related fields or useful technical means in clinical scene such as gene therapy and targeting therapy against cancer cells.

The invention claimed is:

1. A method for transferring a gene into cells, which comprises bringing a mixture of a gene and a composition comprising a diallylamine sulfur dioxide copolymer or a salt thereof into contact with cells, said diallylamine sulfur dioxide copolymer comprising a repeating unit represented by the formula (1):

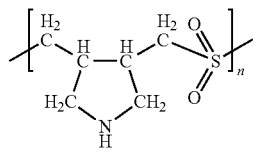

(1)

wherein n indicates an integer of 1 or more.

2. The method for transferring a gene into cells according to claim 1, wherein said diallylamine sulfur dioxide copolymer or a salt thereof is a salt of the diallylamine sulfur dioxide copolymer.

3. The method for transferring a gene into cells according to claim 2, wherein the salt is a salt with at least one acid selected from acetic acid, phosphoric acid and hydrochloric acid.

4. The method for transferring a gene into cells according to claim 3, wherein the acid is hydrochloric acid.

5. The method for transferring a gene into cells according to claim 1, wherein said composition comprises a diallylamine sulfur dioxide copolymer or a salt thereof in a concentration of 1 ng/mL to 200 mg/mL.

6. The method for transferring a gene into cells according to claim 1, wherein said mixture further comprises a polyethylene glycol.

7. The method for transferring a gene into cells according to claim 1, wherein said gene is a single or double stranded DNA or a single or double stranded RNA.

8. The method for transferring a gene into cells according to claim 1, wherein the mixture is sprayed onto a cell in order to bring the mixture into contact with a cell.

9. The method for transferring a gene into cells according to claim 1, wherein said composition comprises a diallylamine sulfur dioxide copolymer or a salt thereof in a concentration of 10 ng/mL to 10 mg/mL.

10. The method for transferring a gene into cells according to claim 1, wherein said diallylamine sulfur dioxide copolymer or a salt thereof has a molecular weight of 300 to 200,000.

11. The method for transferring a gene into cells according to claim 1, wherein said diallylamine sulfur dioxide copolymer or a salt thereof has a molecular weight of 1,000 to 10,000.

12. A method for transferring a negatively charged substance into cells, which comprises
preparing a conjugate of a negatively charged substance and a diallylamine sulfur dioxide copolymer or a salt thereof, wherein said negatively charged substance is DNA or RNA, and said diallylamine sulfur dioxide copolymer comprises a repeating unit represented by the formula (1):

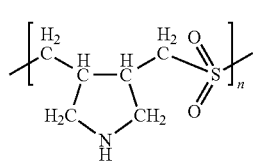

(1)

wherein n indicates an integer of 1 or more; and
bringing said conjugate into contact with said cells.

* * * * *